US011140337B2

(12) United States Patent
Furutake et al.

(10) Patent No.: US 11,140,337 B2
(45) Date of Patent: Oct. 5, 2021

(54) CAMERA MODULE

(71) Applicant: DENSO CORPORATION, Kariya (JP)

(72) Inventors: Yasuki Furutake, Kariya (JP); Yoichi Kajino, Kariya (JP); Kazuma Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/200,993

(22) Filed: Nov. 27, 2018

(65) Prior Publication Data

US 2019/0166313 A1    May 30, 2019

(30) Foreign Application Priority Data

Nov. 29, 2017  (JP) .............................. JP2017-229424

(51) Int. Cl.
| | | |
|---|---|---|
| H04N 5/247 | (2006.01) | |
| H04N 5/232 | (2006.01) | |
| H04N 5/04 | (2006.01) | |
| H04N 5/225 | (2006.01) | |
| G06K 9/00 | (2006.01) | |
| B60R 11/00 | (2006.01) | |
| H04N 9/04 | (2006.01) | |
| B60R 11/04 | (2006.01) | |

(52) U.S. Cl.
CPC ......... *H04N 5/247* (2013.01); *G06K 9/00825* (2013.01); *H04N 5/04* (2013.01); *H04N 5/2252* (2013.01); *H04N 5/2257* (2013.01); *H04N 5/2258* (2013.01); *H04N 5/23238* (2013.01); *B60R 11/04* (2013.01); *B60R 2011/0026* (2013.01); *H04N 9/0451* (2018.08)

(58) Field of Classification Search
CPC .... H04N 5/247; H04N 5/2258; H04N 5/2257; H04N 5/23238; H04N 5/04; H04N 5/2252; H04N 9/0451; H04N 5/23232; H04N 5/23227; H04N 5/3532; H04N 9/04557; G06K 9/00825; G06K 2009/2045; G06K 9/00805; G06K 9/209; B60R 2011/0026; B60R 11/04
See application file for complete search history.

(56) References Cited

U.S. PATENT DOCUMENTS 9,757,070 B2 * 9/2017 Takano ................. A61B 5/681
2005/0285961 A1* 12/2005 Kokubo ............... H04N 5/3765
348/312

(Continued)

FOREIGN PATENT DOCUMENTS

| DE | 102009022277 A | 1/2010 |
|---|---|---|
| DE | 102009012758 A | 9/2010 |

(Continued)

*Primary Examiner* — Michael E Teitelbaum
(74) *Attorney, Agent, or Firm* — Maschoff Brennan

(57) ABSTRACT

A camera is module mounted on an inside of a windshield in a vehicle and is configured to photograph an outside of the vehicle. The camera module includes: a first camera for photographing the outside with a first imaging element through a first lens unit; and a second camera having a view angle narrower than the first camera and photographing the outside with a second imaging element through a second lens unit. The first imaging element and the second imaging element have a same pixel specification.

3 Claims, 4 Drawing Sheets

(56) References Cited

U.S. PATENT DOCUMENTS

| | | | |
|---|---|---|---|
| 2006/0170770 A1* | 8/2006 | MacCarthy | B60R 1/12 348/148 |
| 2009/0135246 A1 | 5/2009 | Uchiyama et al. | |
| 2010/0265331 A1* | 10/2010 | Tanaka | G08B 13/19602 348/159 |
| 2011/0234749 A1* | 9/2011 | Alon | G08G 1/054 348/36 |
| 2012/0155855 A1 | 6/2012 | Okuda | |
| 2012/0162427 A1* | 6/2012 | Lynam | H04N 5/23238 348/148 |
| 2012/0207461 A1 | 8/2012 | Okuda | |
| 2013/0325241 A1* | 12/2013 | Lombrozo | B60W 40/00 701/23 |
| 2014/0016919 A1 | 1/2014 | Okuda | |
| 2014/0146152 A1* | 5/2014 | Frashure | G03B 15/00 348/77 |
| 2014/0153776 A1* | 6/2014 | Takeuchi | G06K 9/00785 382/103 |
| 2015/0085121 A1* | 3/2015 | Englander | H04N 5/23293 348/148 |
| 2015/0215516 A1* | 7/2015 | Dolgin | H04N 5/23293 348/169 |
| 2015/0237790 A1* | 8/2015 | Redden | G01C 11/06 701/50 |
| 2015/0256768 A1* | 9/2015 | Dolgin | H04N 5/332 348/164 |
| 2015/0339805 A1* | 11/2015 | Ohba | G06F 3/011 345/156 |
| 2016/0039358 A1 | 2/2016 | Okuda et al. | |
| 2016/0144505 A1* | 5/2016 | Fong | B25J 9/1697 700/250 |
| 2016/0148062 A1* | 5/2016 | Fursich | H04N 13/239 348/36 |
| 2016/0249499 A1* | 8/2016 | Sumi | H05K 13/0417 |
| 2016/0316110 A1* | 10/2016 | Ross | H04L 7/10 |
| 2017/0113613 A1* | 4/2017 | Van Dan Elzen | G06K 9/209 |
| 2017/0215812 A1* | 8/2017 | Yamaji | A61B 5/1118 |
| 2017/0305361 A1 | 10/2017 | Okuda et al. | |
| 2018/0012085 A1* | 1/2018 | Blayvas | G06T 7/70 |
| 2018/0040151 A1* | 2/2018 | McCullough | H04N 5/23293 |
| 2019/0058826 A1* | 2/2019 | Baldwin | G06T 11/60 |
| 2019/0082101 A1* | 3/2019 | Baldwin | H04N 5/23216 |
| 2019/0088104 A1* | 3/2019 | Crewe | G06K 9/00369 |
| 2019/0098180 A1* | 3/2019 | Tachi | H04N 5/04 |
| 2019/0217888 A1* | 7/2019 | Perry | B62D 15/028 |
| 2019/0294898 A1* | 9/2019 | Jin | B60W 40/02 |
| 2020/0017035 A1* | 1/2020 | Bretagnol | H04N 5/2251 |

FOREIGN PATENT DOCUMENTS

| | | |
|---|---|---|
| JP | 2003-18437 A | 1/2003 |
| JP | 2010-103810 A | 5/2010 |
| JP | 5316562 B2 | 10/2013 |

* cited by examiner

CAMERA MODULE

CROSS REFERENCE TO RELATED APPLICATION

The present application claims the benefit of priority from Japanese Patent Application No. 2017-229424 filed on Nov. 29, 2017. The entire disclosure of the above application is incorporated herein by reference.

TECHNICAL FIELD

The present disclosure relates to a camera module.

BACKGROUND

Conventionally, a camera module that is mounted on the inside of a windshield in a vehicle and is configured to photograph the outside of the vehicle is well known.

SUMMARY

A camera module is mounted on an inside of a windshield in a vehicle, and is configured to photograph an outside of the vehicle. The camera module includes: a first camera for photographing the outside; and a second camera having a view angle narrower than the first camera and photographing the outside.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
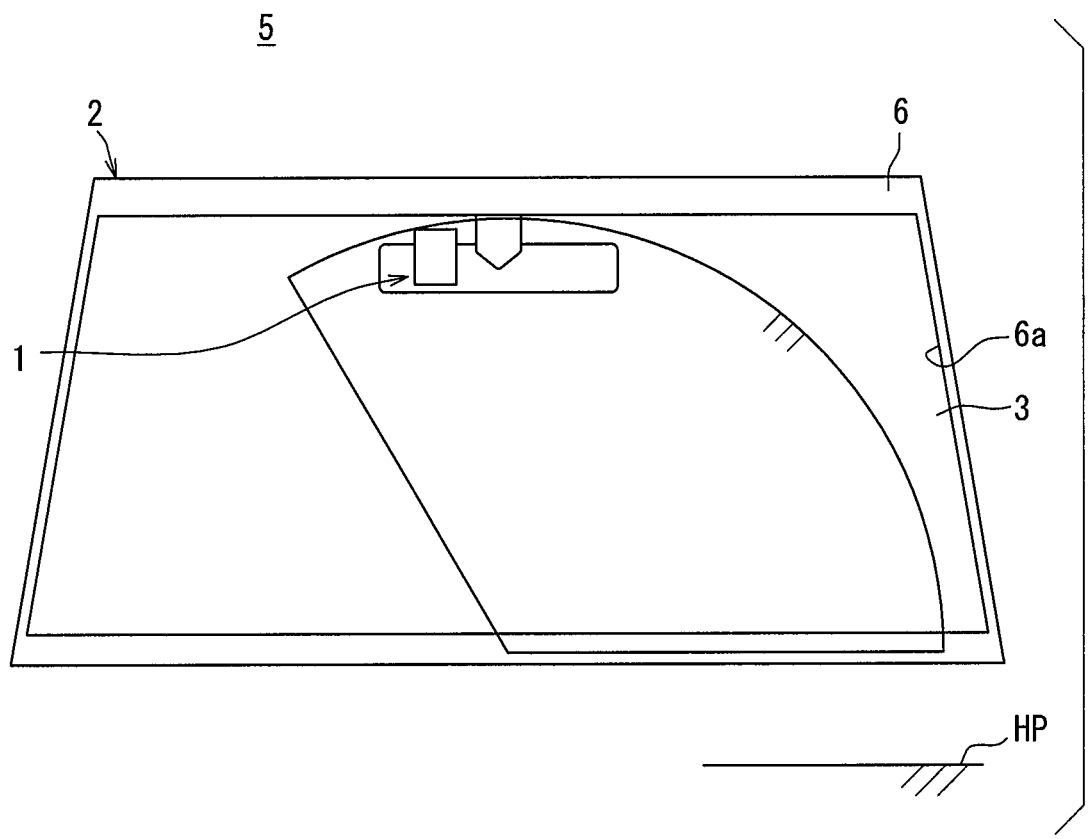
FIG. 1 is a diagram showing a mounting state of a camera module on a vehicle.

Camera modules are required to photograph so as to recognize a wide range of the outside of the vehicle for advanced driving assistance or autonomous driving of the vehicle. As a solution to meet such demands, it is conceivable to adopt a camera with a wide view angle. However, when using a camera with a wide view angle, the resolution may be low, and therefore, it is insufficient for the camera to recognize distant objects with high accuracy.

Thus, a camera module which has the optical performance required for a vehicle application is provided.

A camera module is mounted on an inside of a windshield in a vehicle, and is configured to photograph an outside of the vehicle. The camera module includes: a first camera for photographing the outside with a first imaging element through a first lens unit; and a second camera having a view angle narrower than the first camera and photographing the outside with a second imaging element through a second lens unit. The first imaging element and the second imaging element have the same pixel specifications.

According to such a camera module, a first camera and a second camera having a narrower view angle than the first camera are used in conjunction with each other. Therefore, it is possible to photograph a relatively wide range of the outside of the vehicle with the first camera, and it is possible to improve the recognition accuracy of distant objects with the second camera having a narrower view angle. Therefore, it is possible to obtain the optical performance required for the vehicle application.

Furthermore, when the same pixel specifications are adopted for the first imaging element of the first camera and the second imaging element of the second camera, the processing logic circuit of the image processing is simplified, and by such simplification, for example, it is possible to improve the load or processing speed of image processing. Therefore, in such a camera module combining the first camera and the second camera having different view angles from each other, it is possible to provide a feature that facilitates the image processing.

Hereinafter, a plurality of embodiments will be described with reference to the drawings. It is noted that the same reference numerals are attached to the corresponding constituent elements in each embodiment, and redundant explanation may be omitted. In each of the embodiments, when only a part of the configuration is described, the other parts of the configuration may be applied to the other embodiments. Further, it is possible to not only combine configurations as specified in the description of the embodiments but also partially combine configurations of embodiments even though not specified herein as long as the combination does not cause difficulty.

First Embodiment

The camera module 1 according to the first embodiment is mounted on the vehicle 2, and is configured to photograph the outside of the vehicle. As shown in FIG. 1, the camera module 1 is mounted inside the front windshield 3 of the vehicle 2.

In the present embodiment, forward, backward, forward and backward directions, upward, downward, upward and downward directions, leftward, rightward, and rightward and leftward directions are expressed with respect to the vehicle 2 on the horizontal plane HP as a reference plane unless otherwise specified.

The front windshield 3 is located in front of the driver's seat in the vehicle 2. The front windshield 3 partitions the vehicle compartment from the outside of the vehicle. The front windshield 3 is made of a translucent material such as glass or synthetic resin to transparent the scenery of the outside 5 of the vehicle into the passenger compartment.

The mounting location of the camera module 1 on the front windshield 3 is set at a place that does not significantly disturb the view of the passenger seated in the driver's seat in the passenger compartment. Specifically, the mounting portion of the camera module 1 is set within a range of, for example, about 20% from the upper edge of the opening window 6a of the pillar 6 that has a frame shape and holds the outer peripheral edge of the front windshield 3 in the vehicle 2 with the frame shape. The mounting position on the right-left direction is set within a range of, for example, about 15 cm from the center of the opening window 6a to both sides in the right and left direction. In this way, the camera module 1 is positioned in a portion where the front windshield 3 is inclined, for example, by 22 to 90 degrees.

Figure 2:
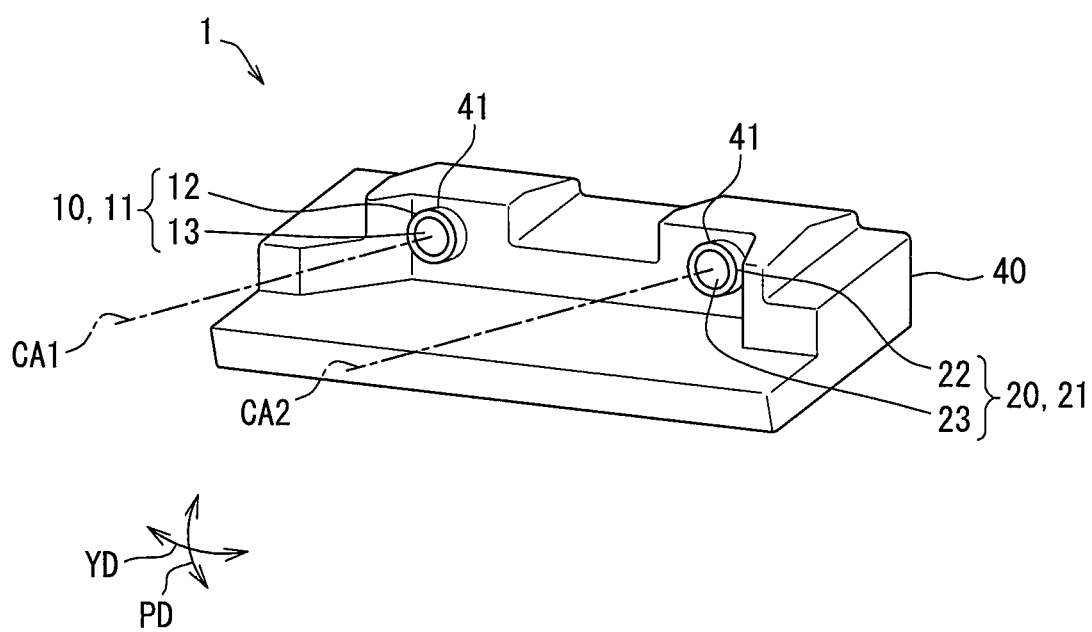
FIG. 2 is a perspective view showing the appearance of the camera module.
Figure 3:
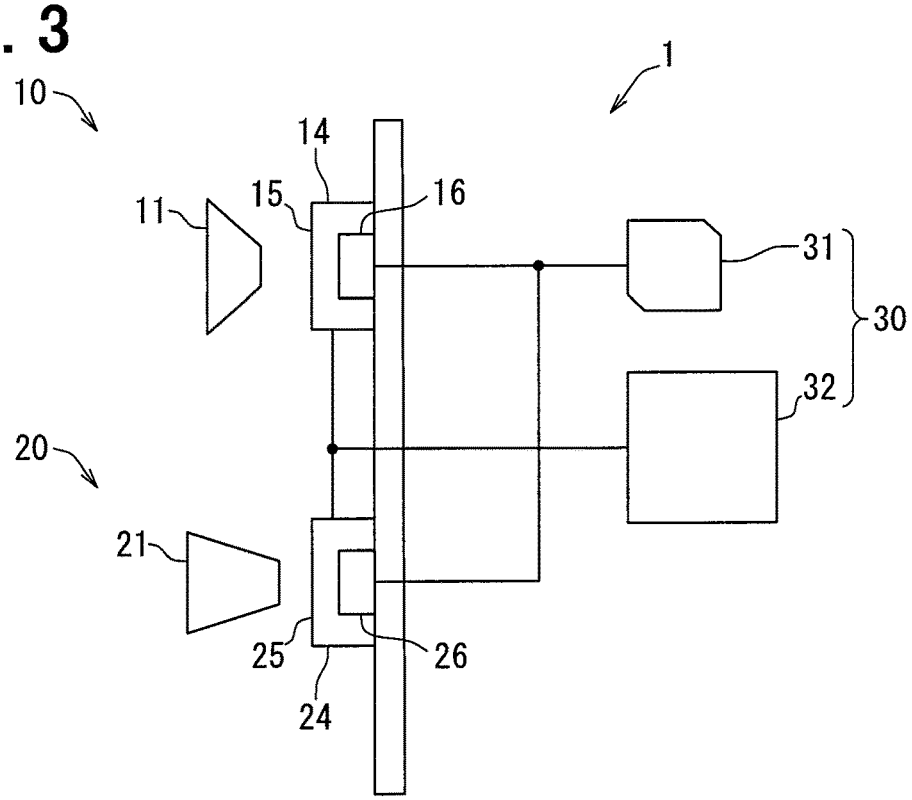
FIG. 3 is a block diagram showing a schematic configuration of the camera module.

As shown in FIGS. 2 and 3, the camera module 1 includes a camera case 40, a first camera 10, a second camera 20, a circuit unit 30, and the like.

The camera case 40 shown in FIG. 1 is formed in a hollow shape to accommodate the first camera 10, the second camera 20, and the circuit unit 30. The camera case 40 is made of a hard material having a relatively high heat radiation property such as aluminum. The camera case 40 is held and positioned by the front windshield 3 via a bracket.

The camera casing 40 has a plurality of opening holes 41 laterally aligned in the right-left direction at positions facing the front windshield 3. Particularly in the present embodiment, two opening holes 41 are formed, and correspond to the first camera 10 and the second camera 20, respectively.

Figure 4:
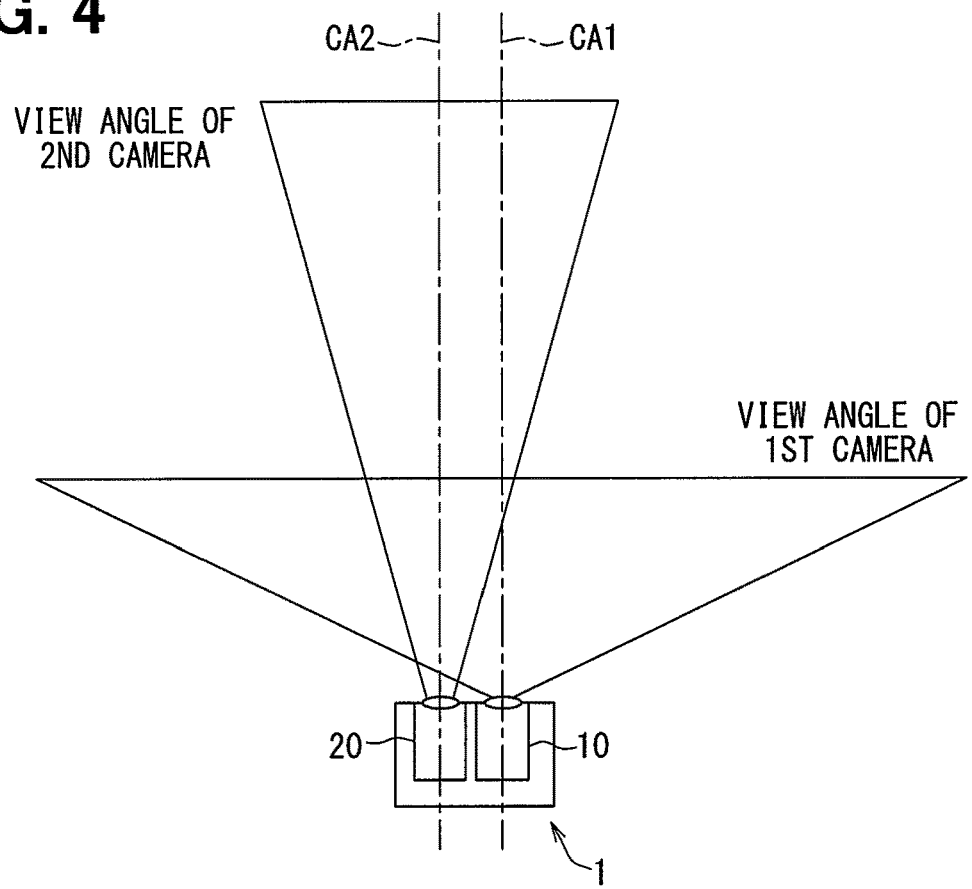
FIG. 4 is a diagram schematically showing the view angle of the first camera and the view angle of the second camera.

The first camera 10 shown in FIGS. 2 and 3 includes a first lens unit 11, a first imaging element 14, and the like, and the outside 5 of the vehicle 2 is photographed by the first imaging element 14 through the first lens unit 11. As also shown in FIG. 4, the first camera 10 of the present embodiment is a wide-angle camera that photographs the outside with a relatively wide view angle of, for example, 100 degrees or more.

The first lens unit 11 has a lens barrel 12 and a lens system 13. The lens barrel 12 is formed in a substantially cylindrical shape as a whole and made of a hard material such as synthetic resin, which is easily and relatively processable. The lens barrel 12 is disposed through the opening hole 41 and is formed to accommodate the lens system 13 therein so that light from the outside 5 can be guided to the first imaging element 14 in the camera case 40.

The lens system 13 includes one or a plurality of lenses, and refracts at least a part of the light incident into the lens barrel 12 so that an inversion image can be formed on the first imaging element 14. The F value of the first lens unit 11 in the lens system 13 is, for example, 2.0. Each lens has, for example, rotational symmetry with respect to the center axis CA1 of the lens barrel 12. Therefore, the center axis CA1 coincides with the optical axis of the first camera 10, and the direction in which the central axis CA1 extends toward the outside 5 is hereinafter referred to as the orientation of the first camera 10.

The first imaging element 14 is an element that converts light into electric signals by photoelectric conversion, and for example, a CCD image sensor or a CMOS image sensor can be adopted to the first imaging element 14. The first imaging element 14 is arranged substantially perpendicular to the central axis CA1 in the camera case 40 with a predetermined distance from the first lens unit 11.

The second camera 20 shown in FIGS. 2 and 3 includes a second lens unit 21, a second imaging element 24, and the like, and the outside 5 of the vehicle 2 is photographed by the second imaging element 24 through the second lens unit 21. As also shown in FIG. 4, the second camera 20 is set to have a narrower view angle than the first camera 10, and in this embodiment, for example, to be a narrow angle camera (also referred to as a tele-camera) having an view angle of 50 degrees or less.

The second lens unit 21 has a lens barrel 22 and a lens system 23. The lens barrel 22 is formed in a substantially cylindrical shape as a whole and made of a hard material such as synthetic resin, which is easily and relatively processable. The lens barrel 22 is disposed through the opening hole 41 and is formed to accommodate the lens system 23 therein so that light from the outside 5 can be guided to the second imaging element 24 in the camera case 40.

The lens system 23 includes one or a plurality of lenses, and refracts at least a part of the light incident into the lens barrel 22 so that an inversion image can be formed on the second imaging element 24. The synthetic focal length of the second lens unit 21 in the lens system 23 (hereinafter simply referred to as focal length) is set to a value larger than the synthetic focal length of the first lens unit 11 (hereinafter simply referred to as the focal length) in the lens system 13. The F value of the second lens unit 21 in the lens system 23 coincides with the F value of the first lens unit 11, and for example, the F value of the second lens unit 21 is 2.0.

Each lens of the lens system 23 has, for example, rotational symmetry with respect to the center axis CA2 of the lens barrel 22. Therefore, the center axis CA2 coincides with the optical axis of the second camera 20, and the direction in which the central axis CA2 extends toward the outside 5 is hereinafter referred to as the orientation of the second camera 20.

The second imaging element 24 is an element that converts light into electric signals by photoelectric conversion, and for example, a CCD image sensor or a CMOS image sensor can be adopted to the second imaging element 24. The second imaging element 24 is arranged substantially perpendicular to the central axis CA2 in the camera case 40 with a predetermined distance from the second lens unit 21.

Here, when it is necessary to process the video image in real time for the vehicle application as in the present embodiment, it is preferable to photograph at a high frame rate. Therefore, in this embodiment, a CMOS image sensor is adopted as each of the imaging elements 14, 24.

Figure 5:
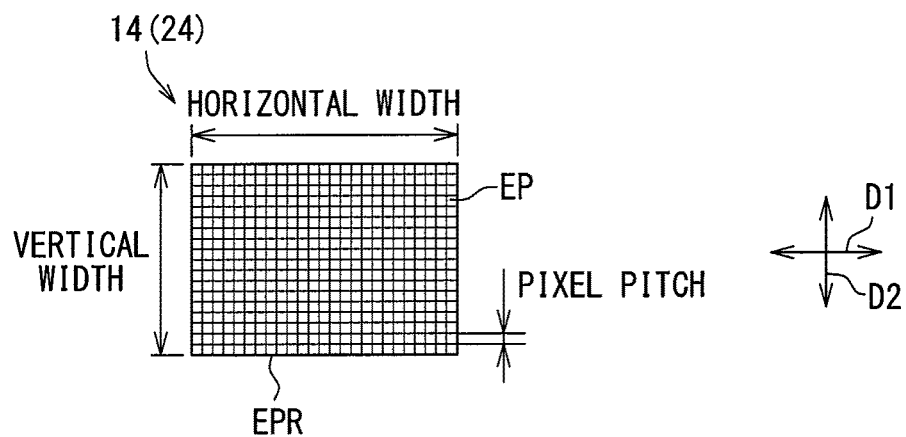
FIG. 5 is a diagram schematically showing a configuration of an imaging element.

As shown in FIG. 5, each of the imaging elements 14 and 24 has pixels arranged in a two-dimensional matrix, and receives external light with color or monochrome to convert the light into an electric charge. Each of the light receiving surfaces 15, 25 of the imaging elements 14, 24 includes an effective pixel EP on which light is incident, an optical black (OB) pixel which defines a reference voltage at the time of darkness by shielding light, and a dummy pixel other than the effective pixel EP and the OB pixel. In each of the imaging elements 14 and 24, the sum of these pixels is referred to as the total pixel number, and the sum of the effective pixels EP is referred to as the effective pixel number. For example, a rectangular region formed on the light receiving surface 15 and 25 by the effective pixels EP is referred to as an effective pixel region EPR.

Furthermore, in pixels arrayed in two dimensions, the arrangement in a predetermined one direction D1 is referred to as a column and the arrangement in the direction D2 perpendicular to the predetermined one direction D1 is referred to as a row. In the present embodiment, the direction D1 corresponds to the longitudinal direction of the effective pixel region EPR of each of the imaging elements 14, 24, and the direction D2 corresponds to the lateral direction of the effective pixel region EPR of each of the imaging elements 14, 24. The camera module 1 is disposed with respect to the vehicle 2 so that the direction D1 is substantially parallel to the horizontal plane HP in each of the imaging elements 14 and 24. The width of the effective pixel region EPR in the direction D1 is referred to as the horizontal width of the effective pixel region EPR, and the width of the effective pixel region EPR in the direction D2 is referred to as the vertical width of the effective pixel region EPR. The interval between the pixels EP in the direction D1 is referred to as horizontal pixel pitch, and the interval between the pixels EP in the direction D2 is referred to as vertical pixel pitch.

Then, the first imaging element 14 and the second imaging element 24 have substantially the same pixel specification. The same pixel specification in the present embodiment means that at least the vertical width and the horizontal width of the effective pixel region EPR are substantially the same between the imaging elements 14 and 24 and at least the vertical and horizontal pixel pitches are substantially the same. When each of the imaging elements 14 and 24 photographs a color image, it is preferable that the color Bayer arrangements of the elements 14 and 24 are substantially the same, and in the present embodiment, the color Bayer arrangements are substantially the same.

In particular, in the present embodiment, the first imaging element 14 and the second imaging element 24 are the same product manufactured by the same imaging device manufacturer. By using the same product as the first imaging element 14 and the second imaging element 24, it is possible to reduce the procurement cost and to manufacture the camera module 1 at a lower cost.

Further, as shown in FIG. 3, phase synchronization circuits 16, 26 are provided in the imaging elements 14, 24, respectively. The phase synchronization circuits 16 and 26 include, for example, a phase comparator, a low-pass filter, a voltage controlled oscillator, and a frequency divider, and are configured as negative feedback circuits for output signals from the voltage controlled oscillator to the phase comparator. The phase synchronization circuits 16 and 26 function to match the phase of the input signal and the phase of the output signal. Specifically, the circuits 16 and 26 function to match the clock signal supplied by the oscillator 31 (to be described later) with the operation clock in each of the imaging elements 14, 24.

Figure 6:
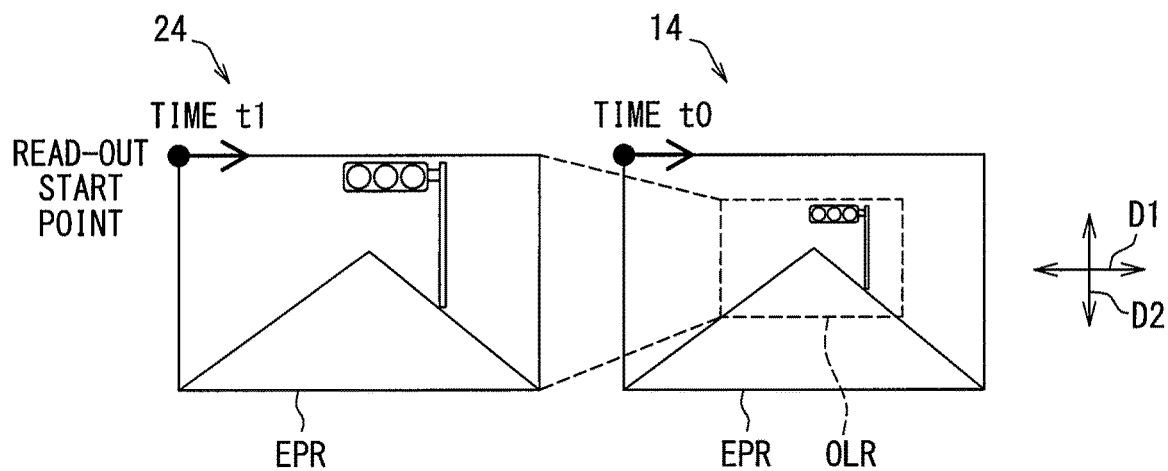
FIG. 6 is a diagram for explaining images and timings of starting read-out by the first imaging element and the second imaging element.

Here, as shown in FIG. 2, the orientation of the first camera 10 and the orientation of the second camera 20 are substantially the same in the pitching direction PD of the vehicle 2. In particular, in the present embodiment, since the orientation of the first camera 10 and the orientation of the second camera 20 are substantially the same also in the yawing direction YD of the vehicle 2, the orientation of the first camera 10 and the orientation of the second camera 20 are completely coincident with each other. Therefore, as shown in FIG. 6, the view angle of the first camera 10 and the view angle of the second camera 20 overlap at least partially in the overlapping area OLR, and more specifically, the view angle of the first camera 10 covers the entire view angle of the second camera 20. The center of the view angle of the first camera 10 substantially coincides with the center of the view angle of the second camera 20.

As shown in FIG. 3, the circuit unit 30 is accommodated in the camera case 40, and has an oscillator 31 and a controller 32. The oscillator 31 generates a clock signal of the camera module 1 as a reference signal using, for example, a crystal oscillator. The oscillator 31 outputs a clock signal to the phase synchronization circuits 16 and 26 formed in the imaging elements 14 and 24. That is, the oscillator 31 outputs a common clock signal to the first imaging element 14 and the second imaging element 24.

Figure 7:
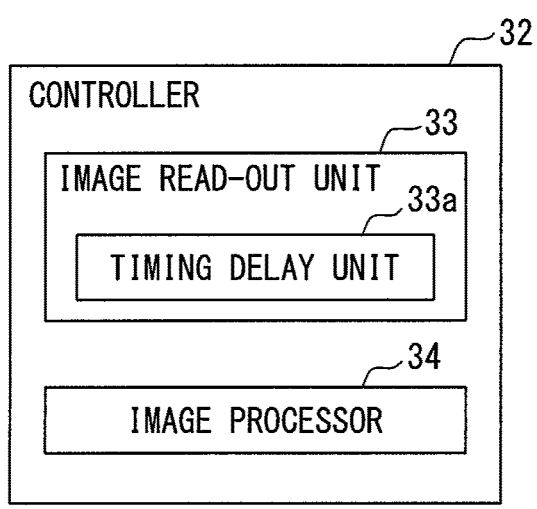
FIG. 7 is a block diagram showing a schematic configuration of a controller.

The controller 32 is an electronic circuit including at least one processor, one memory, and one input/output interface, and can execute various processes by performing, for example, a computer program stored in a memory. Specifically, since the controller 32 is electrically connected to the imaging elements 14 and 24, the controller 32 controls the first imaging element 14 and the second imaging element 24, and also performs an image process on the image data. As shown in FIG. 7, the controller 32 includes an image read-out unit 33 and an image processing unit 34 as function blocks built in such an electronic circuit.

The image read-out unit 33 controls the exposure time by adjusting the timing of the electronic shutter of the pixel EP with respect to each of the imaging elements 14 and 24, reads the pixels EP in order from the endmost row, for example, and obtains the data of the pixels EP as image data. The shutter speed of the first imaging element 14 and the shutter speed of the second imaging element 24 are set to be substantially the same, and the frame rate of the first imaging element 14 and the frame rate of the second imaging element 24 are set substantially the same.

Here, the image read-out unit 33 has a timing delay unit 33a. Using the clock signal supplied from the oscillator 31, the timing delay unit 33a delays the image read-out timing by the second imaging element 24 with respect to the image read-out timing by the first image sensor 14.

Here, the timing delay will be explained as follows as an example when the image read-out unit 33 drives the first imaging element 14 and the second imaging element 24 by a focal plane shutter drive (i.e., a rolling shutter drive). The time interval from the time t0 to the time t3 is a time interval for obtaining one frame, and the driving of this one frame is repeated a predetermined number of times per unit time based on the predetermined frame rate. As a result, a motion picture is shot.

As shown in FIG. 6, in order to acquire an image of one frame, the read-out of the first column from the end of the effective pixel EP of the first imaging element 14 is started at time t0. Then, at the time t1 delayed with respect to the time t0, the read-out of the first imaging element 14 approaches the overlapping region OLR in which the view angles of the cameras 10 and 20 overlap. At time t1 of this timing, the read-out of the first column from the end of the effective pixel EP of the second imaging element 24 is started. Thereafter, at the time t2 (not shown), the read-out of the last column of the effective pixels EP of the first imaging element 14 is completed, and an image of one frame is generated. Thereafter, at the time t3 (not shown), the read-out of the last column of the effective pixels EP of the second imaging element 24 is completed, and an image of one frame is generated.

Such a timing delay makes it possible to reduce the time lag between the imaging time in the overlapping region OLR of the image by the first imaging element 14 and the imaging time in the overlapping region OLR of the image by the second imaging element 24. Here, for example, by setting the read-out speed of the second imaging element 24 to be faster than the read-out speed of the first imaging element 14, the effect spreads over the entire overlapping region OLR.

The image processing unit 34 performs the image process of each image data photographed by the imaging elements 14 and 24. Specifically, the controller 32 recognizes the photographed recognition target by, for example, detecting an edge from each image data. Further, the controller 32 analyzes the overlapping area OLR of each image data photographed synchronously with each other at different view angles by the imaging elements 14 and 24, so that the recognition targets photographed in both of the image data are matched (i.e., this is defined as a pattern matching).

Specifically, when the image processing unit 34 recognizes a recognition target from the image data of one of the first camera 10 and the second camera 20. When the recognition target is photographed in the overlapping area OLR, the image processing unit 34 matches the recognition target with the shooting object photographed in the image data of the other of the first and second cameras 10, 20 as the same recognition target. For example, the image processing unit 34 searches for the vicinity of the area in the other of the first and second cameras 10, 20, which corresponds to the area of the image data in the one of the first and second cameras 10, 20 where the recognition target is photographed. For example, the image processing unit 34 searches for the corresponding pixel EP and its surrounding pixels EP in the other of the first and second cameras 10, 20 by n rows, for example, in the up-down direction.

At this time, if the time lag of the timing at which each image data is captured is large, the recognition target may move, expand or decrease in size during this time lag, and, in the other of the first and second cameras 10, 20, the target recognition object may not be found in the corresponding pixel EP. For this reason, it is necessary to search for n rows of peripheral pixels EP, and when the time lag is large, it is necessary to set a large value of n corresponding to this search range. However, in the present embodiment, since the time lag is reduced by the above-described shooting timing, even when the value of n is set to be small, the pattern matching can be performed satisfactorily. By minimizing the number of columns to be searched, it is possible to suppress the burden on resources such as the memory in the image processing and to speed up the image processing itself.

(Operation and Effect)

The operation and effect of the first embodiment described above will be explained again below.

According to the first embodiment, the first camera 10 and the second camera 20 having a smaller view angle than the first camera 10 are used in combination. Therefore, it is possible to photograph a relatively wide range of the outside of the vehicle with the first camera 10, and it is possible to improve the recognition accuracy of distant objects with the second camera 20 having a narrower view angle. Therefore, it is possible to obtain the optical performance required for the vehicle application.

Furthermore, when the same pixel specifications are adopted for the first imaging element 14 of the first camera 10 and the second imaging element 24 of the second camera 20, the processing logic circuit of the image processing is simplified, and by such simplification, for example, it is possible to improve the load or processing speed of image processing. Therefore, in such a camera module 1 combining the first camera 10 and the second camera 20 having different view angles from each other, it is possible to provide a feature that facilitates the image processing.

Further, according to the first embodiment, the vertical width and the horizontal width of the effective pixel region EPR of the first image sensor 14 are equal to the vertical width and horizontal width of the effective pixel region EPR of the second image sensor 24. Since the pixel specifications of the imaging elements 14 and 24 are made common, in the camera module 1 in which the first camera 10 and the second camera 20 having different view angles from each other are combined, the optical performance required for the vehicle application is obtained, and it is possible to realize a feature that facilitates the image processing.

Further, according to the first embodiment, the pixel pitch of the first imaging element 14 and the pixel pitch of the second imaging element 24 are substantially the same. Since the pixel specifications of the imaging elements 14 and 24 are made common, in the camera module 1 in which the first camera 10 and the second camera 20 having different view angles from each other are combined, the optical performance required for the vehicle application is obtained, and it is possible to realize a feature that facilitates the image processing.

Further, according to the first embodiment, the color Bayer arrangement of the first imaging element 14 and the color Bayer arrangement of the second imaging element 24 are substantially the same. In this way, by commonalizing the sensitivity and resolution of each color in the color Bayer arrangement, the optical performance required in the vehicle application is exhibited in the camera module 1 in which the first camera 10 and the second camera 20 having different view angles from each other are combined, and therefore, it is possible to realize a feature that facilitates the image processing.

Further, according to the first embodiment, the frame rate of the image by the first imaging element 14 and the frame rate of the image by the second imaging element 24 are substantially equal to each other. By doing so, it is possible to easily perform the matching in the image processing by connecting images of the imaging elements 14, 24 one by one.

The F value of the first lens unit 11 and the F value of the second lens unit 21 are matched with each other. By matching the F values to each other, the brightness level received by each of the imaging elements 14, 24 are commonalized. Therefore, in the camera module 1 combining the first camera 10 and the second camera 20 having different view angle from each other, it is possible to realize the optical performance required for the vehicle application and to realize a feature that facilitates the image processing.

The orientation of the first camera 10 and the orientation of the second camera 20 are substantially the same in the pitching direction PD of the vehicle 2. By doing so, it is possible to simplify the process of assembling the cameras 10, 20 at the time of manufacture, for example, so that it is easy to realize the camera module 1 which exhibits the optical performance required for the vehicle application and has the feature that facilitates the image processing.

As a result of such realization of easy image processing, for example, the setting of the threshold value for detecting the edge in the image recognition can be commonly used between the imaging elements 14 and 24, so that the design cost related to the image processing can be suppressed. Further, for example, since a computer program for performing the image processing can be commonly used among the imaging elements 14 and 24, the hardware resources such as memories can be saved.

Second Embodiment

Figure 8:
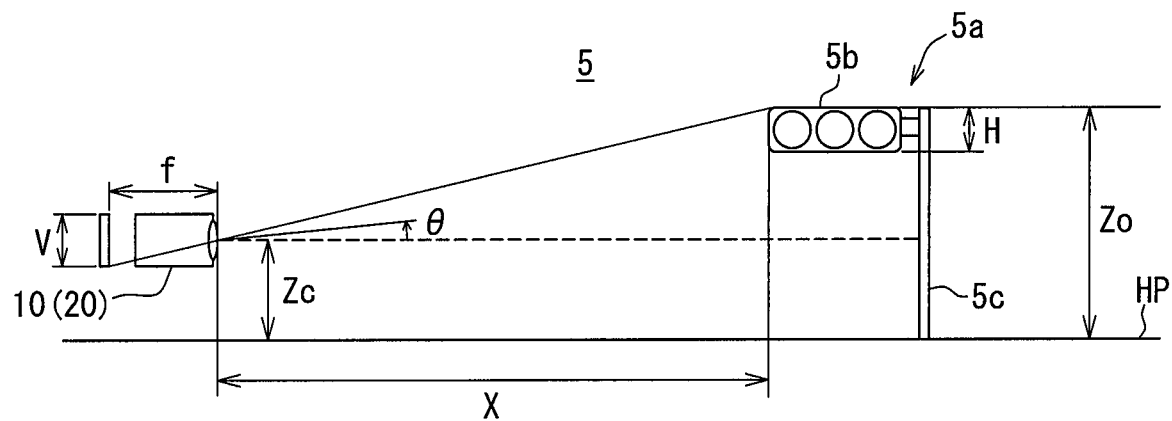
FIG. 8 is a diagram for explaining image recognition of signal display by the camera.
Figure 9:
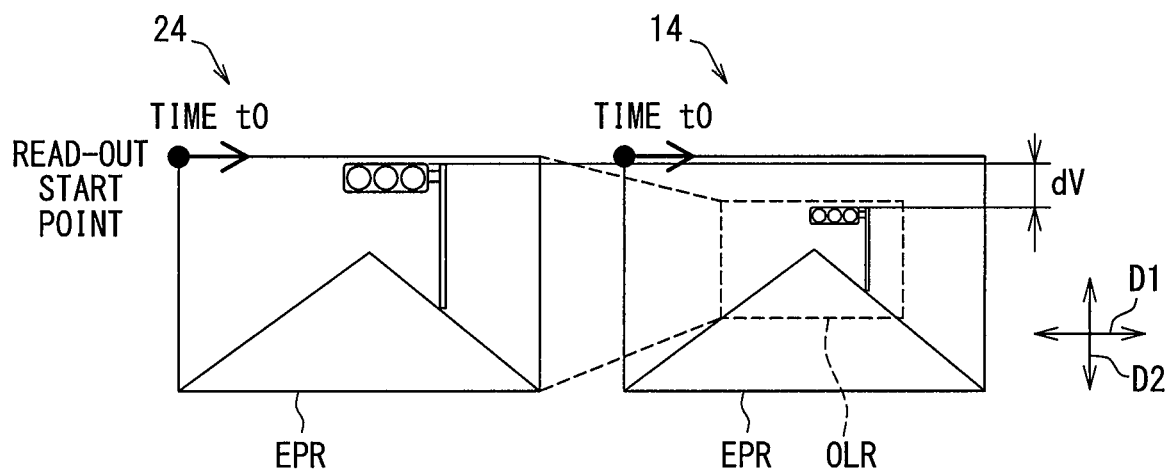
FIG. 9 is a diagram for explaining a deviation amount of the read out.

As shown in FIGS. 8 and 9, the second embodiment is a modification of the first embodiment. The second embodiment will be described focusing on differences from the first embodiment.

As shown in FIG. 8, the camera module 1 of the second embodiment is configured to recognize the signal display 5b displayed by the traffic light 5a having the average height Zo and the average size H in the vertical direction disposed outside 5 of the vehicle.

By using the result of recognition of the signal display 5b of the outside 5, for example, the vehicle 2 performs the autonomous driving, or alerts the driver when the driver is likely to make an erroneous driving operation.

The traffic light 5a is arranged at a position higher than the vehicle 2 so as not to collide with the vehicle 2. As a specific value, for the signal display 5b, the average height Zo in Japan is 5 meters, and the average size H is 0.3 meters in the general road and 0.25 meters in the urban area.

The average height Zo in the United States is 21 to 25.6 feet (that is, 6.4 meters to 7.8 meters). The average size H in Europe is 0.2 meters to 0.3 meters.

It should be noted that the term "average" as used herein is a concept in a broad sense including "general" or "representative" in addition to the meaning of a statistical average in a narrow sense. For example, when the camera module 1 is capable of recognizing the image of the signal display by substantially half or more of the traffic light 5a arranged in the area where the camera module 1 is supposed to be used, it is sufficient to use the term "average."

The controller 32 of the second embodiment does not have the timing delay unit 33a. That is, the start timing of the image read-out by the first imaging element 14 and the start timing of the image read-out by the second imaging element 24 are set to be substantially the same. The read-out speed by the first imaging element 14 and the read-out speed by the second imaging element 24 are set to be substantially the same.

The orientation of the first camera 10 and the orientation of the second camera 20 in the second embodiment are different from each other in the pitching direction PD of the vehicle 2. In particular, in the present embodiment, the orientation of the second camera 20 whose view angle is narrower than that of the first camera 10 faces upward relative to the orientation of the first camera 10. The orientation of the second camera 20 is set in consideration of the first condition and the second condition described below.

The first condition is a condition for suppressing loss of recognition of the signal display 5b when the signal display 5b as a recognition target is deviated from the view angle of the second camera 20. Here, it is assumed that the vehicle 2 is traveling on a horizontal plane HP, and the situation where the traffic light 5a is installed in front of the vehicle 2 will be considered as an example. Then, when the distance X from each of the cameras 10, 20 to the signal display 5b satisfies the following mathematical Equation 1, the recognition target (that is, the signal display 5b) can be recognized by each of the cameras 10, 20.

$$\frac{Z_o - Z_c}{\tan\left\{\mathrm{Tan}^{-1}\left(\frac{0.5\,V}{f}\right) + \theta_c\right\}} < X < \frac{fH}{S} \quad \text{[Mathematica Equation 1]}$$

Here, Zc is the mounting height of the first camera 10 and the second camera 20 from the horizontal plane HP on the vehicle 2. S is the minimum size (measured by the meter) of the object which is necessary for recognizing the image of the object by the first imaging element 14 or the second imaging element 24. V is the vertical width (measured by the millimeter) of the first imaging element 14 and the second imaging element 24. f is the focal length (measured by the millimeter) of the the first lens unit 11 or the second lens unit 21. Zo is the average height (which is converted into the millimeter and assigned) corresponding to the signal display 5b. H is the average size (which is converted into the millimeter and assigned) corresponding to the signal display 5b in the vertical direction. θc is an angle (measured by the degree) of the pitching direction PD with respect to the horizontal plane HP of the first camera 10 or the second camera 20.

It is assumed that Zo is larger than Zc. Also, θc is positive when the pitching direction PD is upward.

It should be noted that the above-described specific value in the area expected to be used can be substituted for the average height Zo and the average size H in the signal display 5b.

In the case where the specific value is indicated by a range, it is more preferable to substitute a value narrowing the range of the above-mentioned Mathematical Equation 1. Also, an appropriate value for achieving the aspect of the present disclosure can be substituted in accordance with the latest legal regulation or a state in the area expected to be used, in addition to the value exemplified as the above specific value.

The upper limit of the distance X is mainly determined by the performance of the image processing unit 34 and the imaging elements 14, 24. The minimum object size S is obtained by an equation of $S = h_d \times p_i$. $h_d$ is a dictionary size (measured by the unit of pix) that can recognize the recognition target. The dictionary size that can recognize the recognition target indicates how many pixels the recognition target forms an image on the imaging elements 14, 24. When the image is formed at the pixels equal to or larger than this number of pixels, the image processing unit 34 can recognize the recognition target. When the image is formed at the pixels smaller than this number of pixels, it is difficult for the image processing unit 34 to recognize the recognition target. $p_i$ is the vertical pixel pitch.

The further the recognition target is located from the camera 10, 20, the smaller the image is formed on the imaging elements 14, 24. When the image of the recognition target is formed smaller, the number of pixels for detecting the light from the recognition target on the imaging elements 14 and 24 is also reduced. Thus, it is also difficult for the image processing unit 34 to recognize the recognition target, In particular, the upper limit of the distance X for the first camera 10 is referred to as a far recognition limit distance. The far recognition limit distance is defined as the limit of the distance from the first camera 10 to the signal display 5b where the signal display 5b as the recognition target is formed on the first imaging element 14 with the number of pixels that can be recognized by the image.

The lower limit of the distance X is mainly determined by the view angle of the cameras 10 and 20. Since Zo is larger than Zc, the recognition target may deviate upward from the view angle of the cameras 10, 20 as the vehicle 2 travels and the distance between the vehicle 2 and the recognition target decreases. When the recognition target deviates from the view angle of the cameras 10, 20, it is difficult for the camera module 1 to recognize the image of the recognition target.

Here, in the present embodiment, since the view angles of the two cameras are different from each other under a condition that the pixel specifications of the imaging elements 14 and 24 are the same, the focal length fw of the first lens unit 11 and the focal length fn of the second lens unit 21 are also different from each other.

As described in the first embodiment, the focal length fw of the first lens unit 11 is set smaller than the focal length fn of the second lens unit 21.

Then, due to its characteristics, the second camera 20 captures a farther recognition target, and as the vehicle 2 travels, the recognition target deviates upward from the view angle of the second camera 20. At this time, it is preferable that the first camera 10 is already in a state capable of recognizing the recognition target. Then, the following condition of Mathematical Equation 2 is satisfied.

$$\frac{Z_o - Z_c}{\tan\left\{\text{Tan}^{-1}\left(\frac{0.5\text{ V}}{f_n}\right) + \theta_n\right\}} < \frac{f_w H}{S} \qquad \text{[Mathematical Equation 2]}$$

Here, θn is an angle (measured by the degree) in the pitching direction PD with respect to the horizontal plane HP of the second camera 20.

In the Mathematical Equation 2, S is a value for the first imaging element 14, and V is a value for the second imaging element 24. In the present embodiment, since each imaging element 14, 24 has substantially the same pixel specification, the symbols of S and V are not particularly distinguished from each other. By deforming the Mathematical Equation 2, the following condition of Mathematical Equation 3 is obtained.

$$\theta_n > \text{Tan}^{-1}\left(\frac{S \cdot (Z_o - Z_c)}{f_w H}\right) - \text{Tan}^{-1}\left(\frac{0.5\text{ V}}{f_n}\right) \qquad \text{[Mathematical Equation 3]}$$

Now, the image processing unit 34 estimates the distance X of the signal display 5b as the recognition target based on the positional relationship between the leg portion 5c of the traffic light 5a and the road surface (in this case, the horizontal surface HP). Therefore, for the second camera 20, it is preferable to secure a depression angle downward so that the following Mathematical Equation 4 is established.

$$\text{Tan}^{-1}\frac{Z_c}{\left[\frac{Z_o - Z_c}{\tan\left\{\text{Tan}^{-1}\left(\frac{0.5\text{ V}}{f_n}\right) + \theta_n\right\}}\right]} + \theta_n < \text{Tan}^{-1}\left(\frac{0.5\text{ V}}{f_n}\right) \qquad \text{[Mathematical Equation 4]}$$

By deforming the Mathematical Equation 4, the following condition of Mathematical Equation 5 is obtained.

$$\theta_n < \text{Tan}^{-1}\left(\frac{0.5\text{ V}}{f_n}\right) - \text{Tan}^{-1}\frac{Z_c}{\left[\frac{Z_o - Z_c}{\tan\left\{\text{Tan}^{-1}\left(\frac{0.5\text{ V}}{f_n}\right) + \theta_n\right\}}\right]} \qquad \text{[Mathematical Equation 5]}$$

In combining the Mathematical Equations 3 and 5, the angle θn of the second camera 20 satisfies the condition of the following Mathematical Equation 6.

$$\text{Tan}^{-1}\left(\frac{S \cdot (Z_o - Z_c)}{f_w H}\right) - \text{Tan}^{-1}\left(\frac{0.5\text{ V}}{f_n}\right) < \theta_n <$$
$$\text{Tan}^{-1}\left(\frac{0.5\text{ V}}{f_n}\right) - \text{Tan}^{-1}\frac{Z_c}{\left[\frac{Z_o - Z_c}{\tan\left\{\text{Tan}^{-1}\left(\frac{0.5\text{ V}}{f_n}\right) + \theta_n\right\}}\right]} \qquad \text{[Mathematical Equation 6]}$$

In other words, the orientation of the second camera 20 is set such that the signal display 5b as the recognition target is disposed within the view angle of the second camera 20 at the far recognition limit distance, and the orientation of the second camera 20 is set such that the horizontal plane HP of the outside is disposed within the view angle of the second camera 20 at the far recognition limit distance.

The second condition is a condition for favorably and rapidly processing the matching procedure between the image by the first imaging element 14 and the image by the second imaging element 24. As described above, in the present embodiment, the read-out of the imaging elements 14 and 24 is started at the same time. Under the condition that the signal display 5b as the recognition target is photographed by both the cameras 10 and 20, the read-out deviation amount dV (measured by millimeter) on the imaging elements 14 and 24 in the read-out direction D2 (i.e., the up-down direction) of the recognition target is represented by the following Mathematical Equation 7 (see also FIG. 9).

$$dV = \left\{0.5\text{ V} - f_w\left(\frac{Z_o - Z_c}{X} - \tan\theta_w\right)\right\} - \left\{0.5\text{ V} - f_n\left(\frac{Z_o - Z_c}{X} - \tan\theta_n\right)\right\}$$
$$= f_n\left(\frac{Z_o - Z_c}{X} - \tan\theta_n\right) - f_w\left(\frac{Z_o - Z_c}{X} - \tan\theta_w\right) \qquad \text{[Mathematical Equation 7]}$$

Here, θw is an angle (measured by the degree) in the pitching direction PD with respect to the horizontal plane HP of the first camera 10.

The delay time t by which the read-out time of the first imaging element 14 reading out the recognition target is delayed with respect to the read-out time of the second imaging element 24 reading-out the recognition target can be calculated by the following Mathematical Equation 8 using the frame rate fps.

$$t = \frac{dV}{V} \times \frac{1}{fps} \qquad \text{[Mathematical Equation 8]}$$

Here, when the vehicle 2 approaches the recognition target at the speed v, the image of the recognition target photographed by the first imaging element 14 is gradually enlarged. As the delay time t increases, the image of the recognition target photographed by the first image sensor 14 is enlarged. A magnification amount E (measured by the unit of pix) of the recognition target photographed by the first imaging element 14 at the delay time t is represented by the following Mathematical Equation 9 with respect to the case where the delay time t is temporarily set to be 0.

$$E = \frac{Z_o f_w}{p_i} \cdot \left\{\frac{1}{X} + \frac{1}{X - vt}\right\} \qquad \text{[Mathematical Equation 9]}$$

When matching both the images, unless the value of n (measured by the unit of pix) in the search range described in the first embodiment is set to be large in accordance with the increasing of the magnification amount E, it is difficult to match the recognition target. Conversely, when the condition that the magnification amount E is smaller than n is satisfied, the matching of the recognition target can be smoothly processed. For example, when the search is performed with n=2, the image processing can be performed at high speed. That is, it is sufficient that the delay time t satisfies the following Mathematical Equation 10.

$$t < \frac{nX^2}{v \cdot \left(nX + \frac{Z_o \cdot f_w}{p_i}\right)} \quad \text{[Mathematical Equation 10]}$$

By the Mathematical Equations 7, 8 and 9, the following Mathematical Equation 11 is satisfied.

$$f_n\left(\frac{Z_o - Z_c}{X} - \tan\theta_n\right) - f_w\left(\frac{Z_o - Z_c}{X} - \tan\theta_w\right) < \frac{V \cdot fps \cdot nX^2}{v \cdot \left(nX + \frac{Z_o \cdot f_w}{p_i}\right)} \quad \text{[Mathematical Equation 11]}$$

Since the distance X in the Mathematical Equation 11 is considered to be larger when the distance X is shorter, it is more preferable to adopt the lower limit value of the Mathematical Equation 1 corresponding to the short distance side. That is, it is more preferable to substitute the value shown in Mathematical Equation 12 into the distance X in Mathematical Equation 11.

$$X = \frac{Z_o - Z_c}{\tan\left\{\text{Tan}^{-1}\left(\frac{0.5\,V}{f_n}\right) + \theta_n\right\}} \quad \text{[Mathematical Equation 12]}$$

Therefore, it is preferable to set the orientation of each camera 10, 20 so as to make the left side of Mathematical Equation 11 smaller. Considering that the height Zo is larger than the height Zc and the focal length fn is larger than the focal length fw, it is effective to set the angle $\theta_n$ to be relatively larger than the angle $\theta_w$.

Therefore, in the second embodiment, the orientation of the second camera 20 is directed upward relative to the orientation of the first camera 10. The difference between the angle $\theta_n$ and the angle $\theta_w$ is set, for example, in the range of 1 degree and 3 degrees, more preferably to be equal to about 2 degrees.

According to the second embodiment described above, the orientation of the first camera 10 and the orientation of the second camera 20 are different from each other in the pitching direction PD. By disposing the second camera 20 in a different orientation with respect to the orientation of the first camera 10 as described above, it is possible to reduce the time lag of photographing by the imaging elements 14, 24 with respect to the recognition target, which is the object of image recognition. In this way, it is easy to match the images of the imaging elements 14 and 24. Therefore, in the camera module 1 in which the first camera 10 and the second camera 20 having different view angles are combined, it is possible to obtain the optical performance required in vehicle applications and to realize a feature that facilitates image processing.

Further, according to the second embodiment, the orientation of the second camera 20 is directed upward relative to the orientation of the first camera 10. With such orientation setting, it is possible to reduce the time lag of photographing by the imaging elements 14, 24 with respect to signal display as a recognition target. In this way, it is easy to match the images of the imaging elements 14 and 24. Therefore, in the camera module 1 in which the first camera 10 and the second camera 20 having different view angles are combined, it is possible to obtain the optical performance required in vehicle applications and to realize a feature that facilitates image processing.

According to the second embodiment, the direction of the second camera 20 is set so that the signal display 5b is disposed within the view angle of the second camera 20 at the far recognition limit distance. In this way, in a case where the signal display 5b deviates from the view angle of the second camera 20 as the distance to the signal display 5b decreases due to the travelling of the vehicle 2, the first imaging element 14 of the first camera 10 can shoot the image of the signal display 5b to be recognizable. Thus, the image of the signal display 5b can be acquired continuously and smoothly from the second camera 20 to the first camera 10.

According to the second embodiment, the orientation of the second camera 20 is set so that the horizontal plane HP is disposed within the view angle of the second camera 20 at the far recognition limit distance. The horizontal plane HP is assumed as the road surface in the outside 5. This makes it easily possible to estimate the distance X of the signal display 5b as the recognition target based on the positional relationship between the leg 5c of the traffic light 5a and the road surface, so that the accuracy of image recognition can be improved.

Also, according to the second embodiment, the condition shown in Mathematical Equation 6 is established. By establishing such a condition, the orientation of the second camera 20 is set such that both conditions are satisfied, one condition being such that the signal display 5b is disposed within the view angle of the second camera 20 at the far recognition limit distance, and the other condition being such that the horizontal plane HP which is assumed as a road surface in the outside 5 falls within the view angle of the second camera 20. Therefore, it is possible to obtain the optical performance required in the vehicle application and reliably realize a feature for easily performing the image processing.

Other Embodiment

Although the embodiments have been described above, the present disclosure is not construed as being limited to the above-described embodiments, but may be applied to various embodiments and combinations without departing from the aspect of the present disclosure.

Specifically, as a first modification, as long as the view angle of the first camera 10 and the view angle of the second camera 20 are different from each other, the view angles may be adjusted according to the usage of the mounted vehicle 2 or the like.

As a second modification, a third camera different from the first camera 10 and the second camera 20 may be additionally provided in the camera module 1, and further another camera may be additionally provided.

As a third modification, under the condition that the Mathematical Equation 6 is satisfied in the second embodiment, the orientation of the first camera 10 and the orientation of the second camera 20 may be the same in the pitching direction PD.

In a fourth modification, at least a part of the controller 32 may be configured as an external device outside the camera module 1. For example, the image processing unit 34 may be configured as an electric control unit (ECU) on the side of the vehicle 2, so that the image recognition may be performed by communication between the camera module 1 and the ECU or the like.

In a fifth modification, the color Bayer arrangement of the first imaging element 14 and the color Bayer arrangement of the second imaging element 24 may be different from each other.

In a sixth modification, the F value of the first lens unit 11 and the F value of the second lens unit 21 may be different from each other.

In a seventh modification, the recognition target is not limited to the signal display 5b. For example, the recognition target may be a preceding vehicle, a pedestrian, a road sign on a road surface, or the like.

In an eighth modification, as long as the lens systems 13 and 23 have rotational symmetry with respect to the central axes CA1 and CA2, a part of the lenses may be eccentric or the like, for example.

As a ninth modification, the camera module 1 may be mounted inside the rear windshield of the vehicle.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A camera module mounted on an inside of a windshield in a vehicle and configured to photograph an outside of the vehicle, the camera module comprising:
a first camera for photographing the outside of the vehicle with a first imaging element through a first lens unit; and
a second camera having a view angle narrower than the first camera and photographing the outside of the vehicle with a second imaging element through a second lens unit, wherein:
the first imaging element and the second imaging element have a same pixel specification;
the camera module is configured to recognize an image of a signal display displayed in a traffic light having an average height and an average size and disposed in the outside of the vehicle;
a limit of a distance from the first camera to the signal display, which is formed on the first imaging element of the first camera with a predetermined number of pixels that is recognizable, is defined as a far recognition limit distance; and
an orientation of the second camera is set to arrange the signal display within the view angle of the second camera at the far recognition limit distance.

2. The camera module according to claim 1, wherein: the orientation of the second camera is set to arrange a horizontal plane within the view angle of the second camera at the far recognition limit distance; and the horizontal plane is defined as a virtual road surface in the outside of the vehicle.

3. The camera module according to claim 2, wherein:
a mounting height of the first camera and the second camera from the horizontal plane is defined as Zc;
a minimum object size required for image recognition in the first imaging element is defined as S;
a vertical width of the second imaging element is defined as V;
a focal length of the first lens unit is defined as fw;
a focal length of the second lens unit is defined as fn;
an average height corresponding to the signal display is defined as Zo;
an average size corresponding to the signal display is defined as H;
an angle of the second camera with respect to the horizontal plane in a pitching direction of the vehicle is defined as θn; and
a mathematical equation of:

$$\mathrm{Tan}^{-1}\left(\frac{S \cdot (Z_o - Z_c)}{f_w H}\right) - \mathrm{Tan}^{-1}\left(\frac{0.5\ V}{f_n}\right) < \theta_n <$$

$$\mathrm{Tan}^{-1}\left(\frac{0.5\ V}{f_n}\right) - \mathrm{Tan}^{-1}\frac{Z_c}{\left[\frac{Z_o - Z_c}{\tan\left\{\mathrm{Tan}^{-1}\left(\frac{0.5\ V}{f_n}\right) + \theta_n\right\}}\right]}$$

is established.

* * * * *